(12) United States Patent
Somekh et al.

(10) Patent No.: US 9,191,788 B2
(45) Date of Patent: Nov. 17, 2015

(54) SYSTEM AND METHOD FOR CONTEXTUAL SOCIAL MESSAGING

(71) Applicant: YAHOO! INC., Sunnyvale, CA (US)

(72) Inventors: Oren Shlomo Somekh, Haifa (IL); Natalia Aizenberg, Haifa (IL); Michal Aharon, Haifa (IL)

(73) Assignee: YAHOO! INC., Sunnyvale, CA (US)

( * ) Notice: Subject to any disclaimer, the term of this patent is extended or adjusted under 35 U.S.C. 154(b) by 163 days.

(21) Appl. No.: 13/973,430

(22) Filed: Aug. 22, 2013

(65) Prior Publication Data

US 2015/0057035 A1   Feb. 26, 2015

(51) Int. Cl.
*H04W 4/14* (2009.01)
*H04W 4/12* (2009.01)
*H04W 4/02* (2009.01)
*H04L 12/58* (2006.01)
*H04L 29/08* (2006.01)
*H04W 4/06* (2009.01)

(52) U.S. Cl.
CPC ............... *H04W 4/12* (2013.01); *H04L 51/32* (2013.01); *H04L 67/26* (2013.01); *H04W 4/02* (2013.01); *H04W 4/021* (2013.01); *H04W 4/023* (2013.01); *H04W 4/06* (2013.01)

(58) Field of Classification Search
CPC ......... H04W 4/02; H04W 4/021; H04W 4/12; H04W 12/06; H04W 4/025; G06Q 30/0261
USPC .................... 455/466, 456.1, 456.3; 715/817
See application file for complete search history.

(56) References Cited

U.S. PATENT DOCUMENTS

| | | | |
|---|---|---|---|
| 2006/0040678 A1* | 2/2006 | Kwon .................... | 455/456.3 |
| 2008/0045236 A1* | 2/2008 | Nahon et al. ........... | 455/456.1 |
| 2010/0228582 A1* | 9/2010 | King et al. .............. | 705/7 |

* cited by examiner

*Primary Examiner* — Kashif Siddiqui
*Assistant Examiner* — Obidon Bassinan
(74) *Attorney, Agent, or Firm* — James J. DeCarlo; Greenberg Traurig, LLP

(57) ABSTRACT

Disclosed is a system and method for selectively delivering shared information. The disclosed systems and methods enable a sending user to decide what context of information is to be shared, in that a sending user can determine when and where information is shared. This enables increased social engagement towards relevant information. Additionally, this enables a vast opportunity for commercial opportunities, whereby advertisements can be served contingent upon a consumer's context, and/or only when the product or service offered to the consumer is relevant.

20 Claims, 9 Drawing Sheets

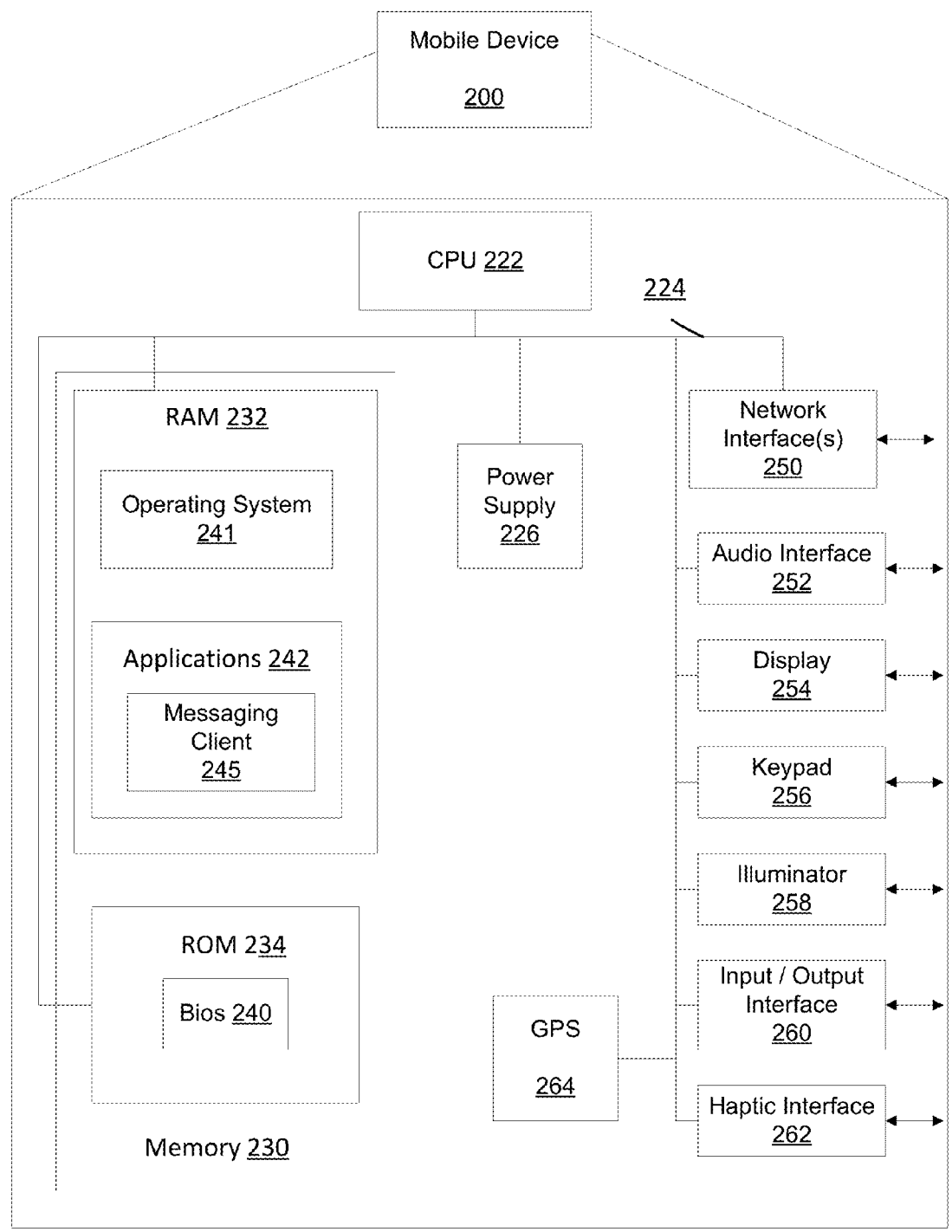

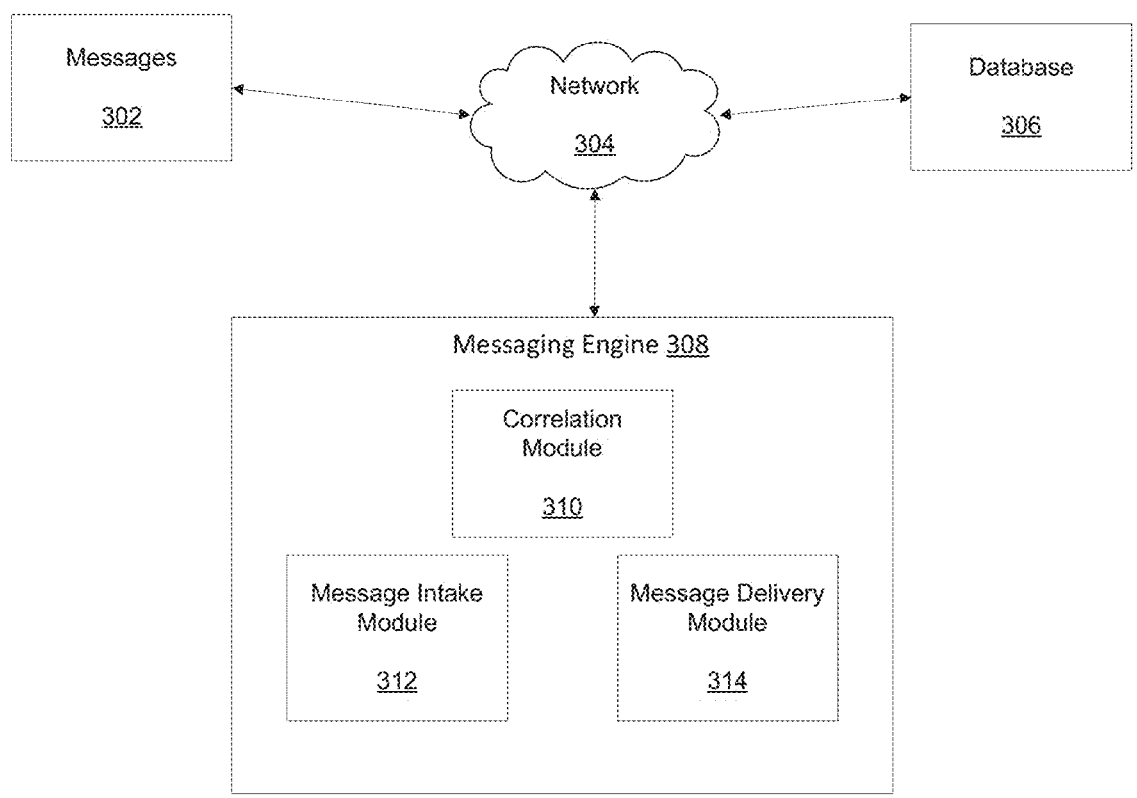

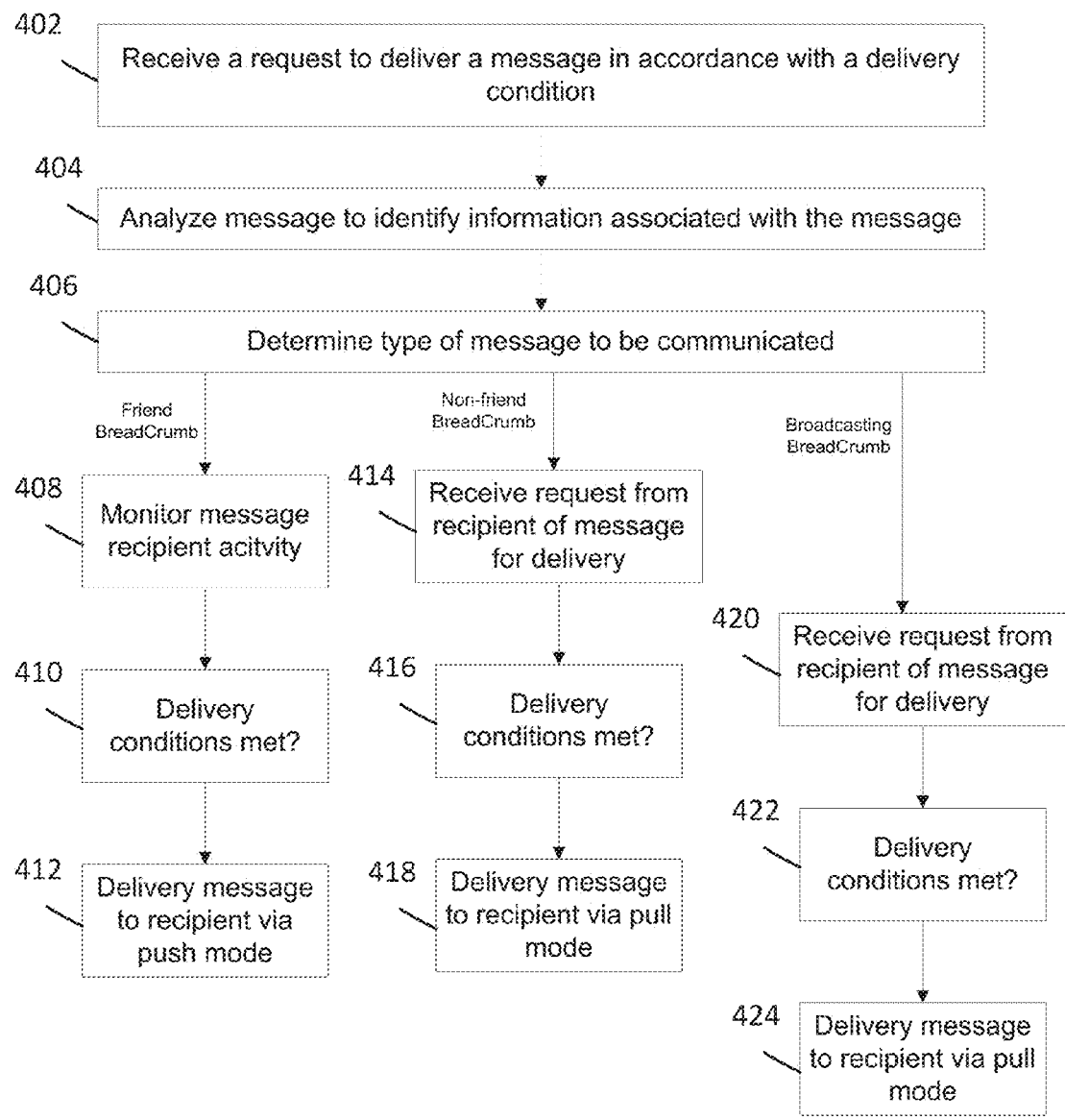

SYSTEM AND METHOD FOR CONTEXTUAL SOCIAL MESSAGING

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to delivering messages on a network, and more particularly, to systems and methods for conditional social message delivery.

RELATED ART

Social communication has been blooming in recent years, allowing people to communicate with an expanding wealth of the population via a variety of social networking and social messaging platforms. This has enabled people to share their opinions and experiences, as well as comment on content items generated and/or shared by others. The convergence of the social communication industry with mobile devices and rich media messaging capabilities has created a variety of new services.

SUMMARY

The present disclosure describes systems and methods for enabling users the ability to channel shared information in a selective manner. The systems and methods discussed herein empower users and facilitate social information sharing via an efficient and natural communication paradigm where information is only delivered when it is relevant. The variety and volume of services, and social messaging items can sometimes be overwhelming. Current services offer users the option of choosing whose information they are interested in, in an attempt to make social communication more manageable, but information sharing criteria has not evolved much, and users are not able to channel their communication selectively and efficiently. Thus, the present disclosure enables a more comfortable and manageable social messaging experience for a user. According to some embodiments, the disclosed systems and methods enable a sender of a message to decide in what context information is to be shared, in that the sender can determine, for example, when and where information is shared. According to some embodiments, context can also include, but is not limited to, a virtual location, Quick Response (QR) codes, specific application usage or any other type of activity leaving some spatial, temporal, social, electronic and/or cyber trace. This enables increased social engagement and enables a vast opportunity for commercial opportunities in addition to increased monetization opportunities, whereby, according to some embodiments, advertisements can be served contingent upon a consumer's context, and/or only when and/or where the product(s)/service(s) offered to the consumer is relevant.

In accordance with one or more embodiments, a method is disclosed for conditionally delivering message. The method includes receiving, at a computing device over a network, a request to deliver a first message from a sender to a mobile device associated with a recipient. The first message comprises message content and a message context, where the message context indicates a location for delivery of the message and a lifespan of the message. The mobile device is associated with an identifier of the recipient. Then, spatial data associated with said mobile device of said recipient is determined based on the identifier, where the spatial data comprises information indicating a current location of the mobile device. After this determination, a determination is made regarding whether the recipient satisfies the message context based on the spatial data. This determination comprises identifying that the spatial data associated with the mobile device of the recipient matches the location for delivery. This matching corresponds to the current location of the mobile device and the location for delivery being at least within a radius of each other. The method then proceeds to delivering, via the computing device, the message to the mobile device associated with the recipient.

In accordance with one or more embodiments, a non-transitory computer-readable storage medium is provided, the computer-readable storage medium tangibly storing thereon, or having tangibly encoded thereon, computer readable instructions that when executed cause at least one processor to perform a method for conditionally delivering social messages.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 2 depicts is a schematic diagram illustrating a client device in accordance with some embodiments of the present disclosure;

FIG. 3 is a schematic block diagram illustrating components of a system in accordance with embodiments of the present disclosure;

FIG. 4 is a flowchart illustrating steps performed in accordance with some embodiments of the present disclosure;

DESCRIPTION OF EMBODIMENTS

Figure 1:
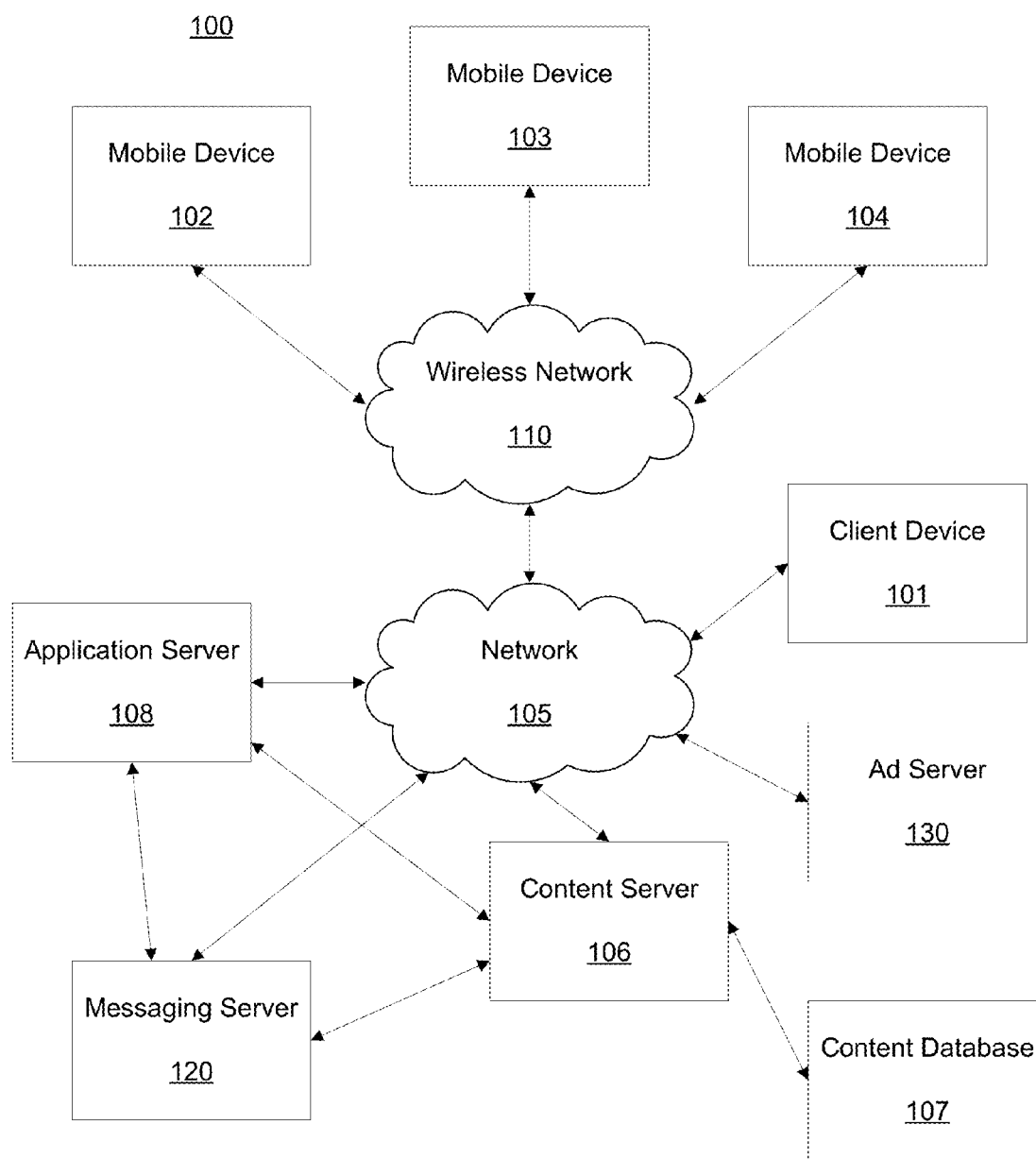
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

For purposes of this disclosure, a "wireless network" should be understood to couple client devices with a network.

A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X. Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")-network 105, wireless network 110, mobile devices (client devices) 102-104 and client device 101. FIG. 1 additionally includes a variety of servers, such as content server 106, application (or "App") server 108, messaging server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, social networking communications, sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly. Wireless network 110 may further employ a plurality of access technologies including 2nd (2G), 3rd (3G), and/or 4th (4G) generation radio access for cellular systems, WLAN, Wireless Router (WR) mesh, and the like. Access technologies such as 2G, 3G, 4G and future access networks may enable wide area coverage for mobile devices, such as mobile devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile devices 102-104 and another computing device, network, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between content servers 106, application server 108, client device 101, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, and the like, that may route the signal packet in accordance with a target address and availability of a network path to the target address.

According to some embodiments, the present disclosure may also be utilized within a social networking site. A social network refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, such as an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, email services, photo services, web services, third-party services, audio services, video services, email services, instant messaging (IM) services, SMS services, MMS services, FTP services, voice over IP (VOIP) services, or the like. Such services, for example the email services and email platform, can be provided via the messaging server 120. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, and the like) for predicting user behavior, such as by group. Advertisements may be presented to users in a targeted audience based at least in part upon predicted user behavior(s). Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users.

During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In an embodiment, users are able to access services provided by servers 106, 108, 120 and/or 130. This may include in a non-limiting example, email servers, social networking services servers, SMS servers, IM servers, MMS servers, exchange servers, photo-sharing services servers, and travel services servers, via the network 105 using their various devices 101-104. In some embodiments, applications, such as a messaging applications (e.g., Yahoo!® Messenger, Yahoo! Mail®, and the like), can be hosted by the application server 108. Thus, the application server 108 can store various types of applications and application related information including application data and user profile information. In another example, messaging server 120 can host messaging applications; therefore, the messaging server 120 can store various types of applications and application related information including messaging application data and user profile information. It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies including, but not limited to, global system for Client communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with another user of another client device. Other examples of application programs include calendars, browsers, contact managers, task managers, transcoders, database programs, word processing programs, security applications, spreadsheet programs, games, search programs, and so forth. Applications 242 may further include messaging client 245 that is configured to send, to receive, and/or to otherwise process messages using SMS, MMS, IM, email, VOIP, and/or any of a variety of other messaging communication protocols. Although a single messaging client 245 is illustrated it should be clear that multiple messaging clients may be employed. For example, one messaging client may be configured to manage SMS messages, where another messaging client manages IM messages, and yet another messaging client is configured to manage serving advertisements, emails, or the like.

Having described the components of the general architecture employed within the disclosed systems and methods, the components' general operation with respect to the disclosed systems and methods will now be described with reference to FIGS. 3-6.

The principles described herein may be embodied in many different forms. The present disclosure involves an application (or service) for delivery of contextually sensitive social messages. Unlike existing messaging and microblogging services and applications, the present disclosure allows a user to decide in what context information is to be shared. That is, according to some embodiments, the present disclosure allows users to determine when and where information they share is of relevance. Then by exploiting existing technology, for instance location identification, the message will be delivered to the specified recipient upon reaching the defined location in the predefined time frame (or during the message's lifespan). While the recipient of the message enjoys relevant information at the right time and/or place, the sender enjoys a service that allows the user to share information more selectively and on a "need-to-know" basis. Thus, as discussed in more detail below, the systems and methods discussed herein enable increased monetization opportunities via increased targeted user engagement with information.

In some embodiments, the present disclosure can be implemented as a standalone application, for example, on a mobile device powered by any known to or be known mobile platform, such as, but not limited to, Android®, iPhone®, Windows® Mobile, and the like. In some embodiments, the application or service can be integrated into a messaging platform, such as, but not limited to, Yahoo! Messenger®, Yahoo! Mail®, and the like. In some embodiments, the disclosed systems and methods can be hosted by a backend server and enabled via an application running on a client device.

The types of messages discussed herein will be referred to as a "BreadCrumb." A "BreadCrumb" is any type of media or text message with a defined context of existence. A BreadCrumb differentiates and improves upon current technology by enabling delivery conditioned upon a recipient of a message being in a certain context, which is defined by the sender. The present disclosure provides systems and methods for a user to determine under which circumstances their message(s) should reach its destination (e.g., recipient). In some embodiments, the context (or delivery condition) for determining such conditional delivery is based on time (when) and/or place (where). In some embodiments, the context can be based on a user's activity, such that upon a certain activity, such as, but not limited to, running, walking, driving, and the like. In some embodiments, an activity determination can also result in a message being halted or not being transmitted, as discussed below. In some embodiments, the context can be based on a type of event occurring, such as, a weather determination, such as, raining, sunshine, and the like. In some embodiments, a context can be based upon any information, data, event or the like, that comprises a digital signature. Such contexts can be carried with, correspond to, or associated with a message via spatial data and temporal data. For example, spatial data may include any passively collected location data, such as cell tower data, global packet radio service (GPRS) data, global positioning service (GPS) data, WI-FI data, personal area network data, IP address data and data from other network access points, or actively collected location data, such as location data entered by the user. Temporal data is time based data (e.g., time stamps) that relate to specific times or time periods/frames, and/or events associated with a user and/or the electronic device. For example, temporal data may be passively collected time data (e.g., time data from a clock resident on the electronic device, or time data from a network clock), or the temporal data may be actively collected time data, such as time data entered by the user of the electronic device (e.g., a user maintained calendar).

In some embodiments, additional contexts (or conditions) can be implemented. For example, a virtual location, specific application usage or any other type of activity leaving some electronic and/or cyber trace may be utilized as a context for conditional delivery of a message. In some embodiments, Quick Response (QR) codes may be utilized as a context. For example, as discussed in more detail below, upon a recipient opening an eBay® application on their phone, the recipient may receive a coupon for purchasing a product via that service. Additionally, in some embodiments, a BreadCrumb can be directed to specific individuals or to predefined groups, as discussed in more detail below. Indeed, a BreadCrumb can carry an expiration date, where it is retired, as non-limiting examples, by the sender, owner, originator, or creator, at any time, or after a predetermined period of time or occurrence of an event, whereby the conditional message would never reach any recipient (or additional or subsequent recipient(s)) after retirement.

According to some embodiments, BreadCrumbs, unless specifically described otherwise, may only reach each recipient once. According to some embodiments, when left by "friends", BreadCrumbs can be served in a push mode; or, as understood by those of skill in the art, delivered automatically without any explicit request from a recipient. In some embodiments, a pull mode can be applied for BreadCrumbs left by unknown users or commercial entities. As understood by those of skill in the art, a pull mode requires a user to prompt for messages actively via a user initiated interaction. In some embodiments, BreadCrumbs may be broadcasted, or left for all users upon a recipient satisfying a context associated with a given BreadCrumb. In some embodiments, broadcasting fees may apply in order to prevent senders of such broadcasted messages from spamming other users. Indeed, as opposed to existing or conventional location based services, such as Foursquare®, a sender (or owner, etc. as set forth above) of a BreadCrumb is not required to be in the context of a given BreadCrumb to be able to define it. That is, a user can leave a BreadCrumb in a place without ever having been there.

According to some embodiments, a BreadCrumb can be acknowledged, answered, forwarded and/or voted upon, in other ways be made feedback sensitive. Based on recipient's interactions with a BreadCrumb, the BreadCrumb may enjoy promotions by a system, attaching it to some indication of value or popularity. Such value can be attributed to a number of acknowledgements, reads, forwarding and/or votes. Thus, BreadCrumbs detected as highly valuable by a system, advertiser, user, or combination thereof, may be proposed for broadcasting to all users without any charges applied. As the recipient of a BreadCrumb indicates being at a specific context, e.g., a location, for privacy protection, the recipient of a BreadCrumb will be able to decide whether to send a notification of acceptance. Additional ways of protecting recipient privacy may include, but are not limited to, blocking certain entities or turning off (and/or on) the service.

By way of some non-limiting examples to illustrate the systems and methods discussed herein, below are some use cases for the applications of a BreadCrumb application/service:

Travel:

Iris is traveling outdoors with her family and finds that one route in the nature reservation is extremely interesting. Iris then leaves a BreadCrumb to all her friends visiting the reservation area in the following year, saying this is a great route with a picture showing of what's' ahead to those who choose to follow it.

Family:

Dana wants to make sure that her husband does not forget to pick up some extra butter when he goes shopping today, as she plans to bake a cake tonight. If she sends him a reminder while he is at the office, he is likely to forget it by the time he gets to the supermarket. Therefore she leaves a BreadCrumb at the supermarket where he will be shopping (without being there herself), to remind him to buy extra butter. That way as soon as he approaches the supermarket (e.g., within a radius of the location), the BreadCrumb is going to appear on his device.

Carpooling:

Danny will gladly catch a ride with one of his colleagues to work today, if they happen to pass near his neighborhood between 7:30 and 8:00. Leaving them a BreadCrumb will be an unimposing way to ask for a ride.

Social:

Nora goes downtown with her new boyfriend, and leaves a few of her girlfriends a BreadCrumb about being in a specific pub in the following couple of hours. If one of these friends is around—she might want to come and join her for a casual encounter with the new boyfriend. Although existing location based services, such as Foursquare®, may be used in this manner, such existing services do not offer the ability to choose specific recipients, and Nora is not likely to be able to use them as she does not want everyone accidentally in the area to know the details of her whereabouts and company.

Services:

A ski resort may create a group for its visitors and leave daily BreadCrumbs with hazard warnings in some parts of the slope, or certain trails.

In addition to the demonstrated user value as mentioned above, and discussed in more detail below, BreadCrumbs further facilitate increased monetization opportunities to users and entities. The disclosed systems and methods can provide the BreadCrumb service/application to commercial entities and/or organizations. That is, an entity or organization can broadcast BreadCrumbs (or contextual messages) in specific locations to all logged in users, and, in some embodiments, such BreadCrumbs can be contingent upon scheduled times. For example, a restaurant publishes a free coffee coupon for visitors between 11:00 AM to 1:00 PM on weekdays. All BreadCrumb application users in the restaurants area at that time, or during that time span, will be invited to enjoy free coffee. While such BreadCrumbs will only be served in pull mode, unless a user already added this restaurant to his friends list, the availability of relevant and lucrative BreadCrumbs in pull mode will entice users to pull whenever they reach a commercial area.

In some embodiments, the present disclosure enables a platform for viral advertising in the form of BreadCrumbs left by users to their friends in return for coupons and/or discounts. As part of such platform, the BreadCrumb application/service will offer immediate confirmation of the number and reputation of a BreadCrumb's intended recipients. Such platform may require a predefined BreadCrumb to be generated by a commercial entity, with predefined radius and/or expiration date, and/or minimum number of recipients.

According to some embodiments, such BreadCrumbs can be priced based on expiration time, a radius to a location and/or real estate value, which is driven by BreadCrumb density in an assigned location. For example, prices for broadcasting a BreadCrumb may increase should the expiration time be longer than required, the radius be larger than needed and cover another identifiable geographical region, or the density of a location be higher than that of a standard value. Pricing can also be determined using the number of service approved BreadCrumbs, the number of opened BreadCrumbs and/or the number of BreadCrumbs used (if a BreadCrumb is offering a discount or coupon). For example, if a BreadCrumb is offering a discount, then the price to broadcast such BreadCrumb may be reduced at first and off-loaded, where upon usage of the discount another subsequent payment may be required as the discount has increased the sender's (or owner or broadcaster) business.

Further, the BreadCrumbs service/application involved within the presently disclosed systems and methods can also support and host different public services, hence offering higher user value and an increased incentive for its users. For example, a governmental institute (e.g., law enforcement agency) can use this service in order to alert the public on hazards like a roadblock. For example, the agency can set a BreadCrumb stating "If you planned on using road 644 North, please choose a different path. This road is blocked." While similar notifications are offered by navigation services, such navigation services only offer alerts which related to traffic and focus on a driver's present needs overlooking the pedestrian perspective. Also, navigation services do not offer any control over lifespan, or prospective outlook regarding a user's planned path, or general scope of a geographical region.

As discussed herein, the disclosed systems and methods effectuating applications of the BreadCrumb service/application, allow easy integration with existing social network services, as well as email and messaging, and a straight forward utilization of contact lists and friends to save users' time in declaring their friendships and relations.

FIG. 3 illustrates elements of a system 300 implementing a BreadCrumb engine 308 adapted to perform message delivery according to embodiments of the systems and methods discussed herein. FIG. 3 includes a plurality of messages 302, a network 304, a messaging engine 308 and a database 306 for storing messages. The BreadCrumb engine 308 could be hosted by a web server, messaging server, content provider, message/email/social networking service provider, ad server, a user's computing device, or any combination thereof. The plurality of messages 302 can be any type of message. The messages 302 can be provided to the BreadCrumb engine 308 or accessed by a computer program or device that can access the messages. In some embodiments, the messages 302 can be stored in a database of stored messages 306, which is associated with a message platform/provider, such as Yahoo! Messenger®. The database 306 can be any type of database or memory that can store the messages 302 and associated message information (e.g., delivery conditions for messages), as discussed above. For purposes of the present disclosure, messages as a whole are discussed within some embodiments; however, it should not be construed to limit the applications of the systems and methods discussed herein. Indeed, while reference is made throughout the instant disclosure to instant messages (e.g., Short Message Service (SMS) messages, Multi-media Message Service (MMS) messages, and the like), other forms of electronic documents or transmissions (e.g., electronic mail messages ("e-mail")) can be received and/or accessed and processed by the BreadCrumb engine 308 according to the systems and methods discussed herein.

As discussed above, with reference to FIG. 1, the network 304 can be any type of network such as, but not limited to, a wireless network, a local area network (LAN), wide area network (WAN), the Internet, or a combination thereof. The network 304 facilitates connectivity between the messages 302, the BreadCrumb engine 308, and the database of stored resources 306.

The BreadCrumb engine 308 includes a correlation module 310, a message intake module 312 and a message delivery module 314. It should be understood that the engine(s) and modules discussed herein are non-exhaustive, as additional or fewer engines and/or modules may be applicable to the embodiments of the systems and methods discussed herein.

The message intake module 312 can receive the messages 302 from the network 304 and/or a server or access the messages 302 stored in the database of stored messages 306 and route, or facilitate routing the messages 302 to various users (i.e., recipients) of the message engine 306. As such, the message intake module 312 is adapted to receive messages and their associated delivery conditions from senders via a various communication channels, networks and devices. Upon reception of a message with delivery conditions, the message intake module 312 identifies the recipients of the message and the delivery conditions associated with the message, as discussed in more detail below. In some embodiments, the message intake module 312 requests that the correlation module 310 correlate the information derived from the identified recipient(s) with information related to the delivery conditions, as discussed in more detail below. Indeed, according to some embodiments, the information received and processed by the message intake module 312 is passed to the correlation module 310.

It should be understood that a sender and/or recipient may be identified by information attributable to the platform, service, application, and/or device the sender and/or recipient is utilizing to send and/or receive messages, respectively. For example, a message may be sent or directed to a telephone number, IP address, username, email address, or any other known or to be known identifier of a user on a network, or within an application platform.

The correlation module 310 is configured to identify relationships between a sender of a message, a recipient(s) and the associated delivery condition(s) of the message. According to some embodiments, such relationship can be determined by creating a combined graph of any combination of a sender and a recipient, and their attributes and relationships within contexts or events/situations. Additionally, the correlation module 310 operates as a sensor analytics pre-processor for attention events from any internal or external source. That is, the correlation module 310 is configured to monitor the information associated with each communicated (or transmitted or received) message in order to determine if any conditions are identified that may trigger an action on the part of the BreadCrumb engine 308. For example, if a delivery condition has been associated with a message, when the correlation module 310 determines that the condition is met, it can transmit the appropriate trigger information to the message delivery module 314 that triggers delivery of the message, as discussed in more detail below. The correlation module 310 instruments all appropriate network nodes, clouds, users, applications, or any combination thereof, and includes close interaction with other modules in the BreadCrumb engine 308.

According to some embodiments, the correlation module 310 performs graphing the available data related to a sender of a message, a recipient(s) and the associated delivery condition(s) of the message. As understood by those of skill in the art, graphing, or the act of creating a histogram, is a computer science method of identify a distribution of data in order to identify relevant information and make correlations between the data. In a more general mathematical sense, a histogram is simply a mapping $m_i$ that counts the number of observations that fall into various disjoint categories (known as bins), whereas the graph of a histogram is merely one way to represent a histogram. By identifying a sender and each recipient, and delivery conditions (e.g., parameters including, but not limited to, times, dates, locations, and the like) as different bins and mapping the available data, relationships between the sender of a message, the recipient(s) and the associated delivery condition(s) of the message can be determined.

According to some embodiments, the information processed by the BreadCrumb engine 308 and the modules discussed herein, is analyzed using data models that treat the information not as abstract signals stored in databases, but rather as data that actually exists, has existed, or will exist in real space, real time, and are real people, objects, places, times, and/or events. As such, the data modes will model not only the signals processed from senders and recipients, but also can represent these senders and recipients and their interactions in ways that model the affordances and constraints of entities and activities in the physical world. A notable aspect is the modeling involves real world contexts so that the computations timing, location, identify, distance, and inference take into account the states and actions of the senders and recipients respective real word conditions (e.g., delivery conditions) and the contexts and patterns of these states and actions.

By way of a non-limiting example according to some embodiments of the present disclosure, for temporal data related to a delivery condition, a BreadCrumb model may not merely treat times, period of times, or a range of times associated with the temporal data (or condition) as a linear function. That is, the temporal distance and similarity between two times may be dependent upon an absolute linear temporal delta between them, in addition to the context and activities (or events) that condition the significance of these times. For example, in terms of distance and similarity, "Tuesday. Dec. 31, 2013, 12:00 pm Central Time" and "Tuesday, Jan. 7, 2014, 12:00 pm Central Time" may be modeled as closer together as a result of a weekly event occurring at that specific time each Tuesday. Thus, contextual and periodic patterns in time, respective certain events, may be important to the modeling of temporal data within embodiments of the present disclosure.

By way of another non-limiting example, spatial data related to a delivery condition can be based upon related information indicating a recipient being at a location, within a radius of a location (e.g., vicinity of a location or predetermined distance from a location), or determined to be a location at a determined/expected future time, which accounts for the modeling of temporal data, as discussed above.

According to some embodiments, the BreadCrumb engine 308 can implement a variety of machine learning techniques to analyze sender, recipient and delivery condition data/information. That is, according to some embodiments, data processed by the BreadCrumb engine 308 can be modeled as a "feature vector" where the vector includes not only raw sensed data from or about a recipient and/or delivery condition, but also higher order features that account for the contextual and periodic patterns of the states and actions of a recipient respective identified delivery conditions set by the sender of the message. Each of these features in the feature vector may have a numeric or symbolic value that can be compared for similarity to other numeric or symbolic values in a feature space. Each feature may also be modeled with an additional value (a certainty value) to represent a probability that the feature will occur (or is true). Through applications of the BreadCrumb engine 308 in these manners, and modules (and/or sub-modules) discussed herein, the disclosed systems and methods can account for the affordances and constraints of context and patterns in the physical world respective features and higher order features with or without certainty values. Therefore, data (whether represented in feature vectors or by other data modeling techniques) processed by the BreadCrumb engine 308 (and the modules therein) can then be processed to determine similarity, difference, hierarchical and graph relationships, as well as inferential relationships among the senders, recipients, locations and times, respective the delivery conditions of each message.

Indeed, according to some embodiments, the BreadCrumb engine 308 can implement a wide variety of known and to be known statistical and machine learning techniques, including by not limited to, histograms, Sparse Factor Analysis (SFA), Hidden Markov Models (HMMs), Support Vector Machines (SVMs), Bayesian Methods, and the like. Such learning algorithms may be populated with data models that contain features and higher order features representing not only the "content" of the transmitted signals, but also model the contexts and patterns of the senders and recipients respective the delivery conditions of each message The message delivery module 314 is configured to control the delivery of messages. According to some embodiments, the message delivery module 314 logs the delivery conditions for a message, and monitors recipients and/or real world locations (such as for example entity information) or event information, for occurrence(s) of the delivery conditions associated with the communicated message. When/if the delivery conditions are met, the message delivery module 314 then delivers the message to the recipient, as discussed in more detail below. This may include selecting a delivery route or communication channel. As discussed in more detail below, the message delivery module 314 can be implemented via a push mode or pull mode. In some embodiments, delivery of a message may be triggered in response to a request, triggered by some other input from a sender, recipient, a third party or occurrence of another event, or may be automatically determined on a periodic basis and stored for later use, or denied as a result of a "retirement" of a message, as discussed in more detail below.

FIG. 4 is a flow chart illustrating process 400 implementing the components of system 300 for delivering contextually relevant messages (such as BreadCrumbs) in accordance with embodiments of the present disclosure. According to some embodiments, depending on how the architecture is implemented, the operations described herein may be performed by one or more of the various components, engines and modules described above in relation to FIG. 3. In addition, sub-engines and/or sub-modules may be created and used to perform specific operations in order to improve the network's performance as necessary.

As discussed above, the present disclosure involves applications of a BreadCrumb service/application for delivering messages. BreadCrumbs are only delivered in a defined context and additionally offer actions to be performed by a recipient of a BreadCrumb. Such actions include, but are not limited to, sending a notification or conformation of delivery of a BreadCrumb, forwarding either the same BreadCrumb or extending the BreadCrumb to another recipient, and/or voting (or providing feedback) to the BreadCrumb.

As discussed above, each BreadCrumb is assigned by its owner (or the sender) a context, e.g., conditions including, but not limited to, a lifespan (or expiration date), recipients (e.g., individuals or groups), a location and a radius. BreadCrumbs can be implemented using various known or to be known location identification technologies integrated into devices (e.g., mobile devices) to determine the location of the users associated with the BreadCrumb. Such technologies include, but are not limited to, GPS, Wi-Fi, RFID readers and tags, as well as Quick Response (QR) codes. Indeed, spatial and temporal data respective recipients (and in some embodiments owners) of BreadCrumbs can be continuously monitored and learned via known or to be known machine learning techniques, and applied via known or to be known collaborative filtering techniques in order to apply the contextually relevant and sensitive contexts for each BreadCrumb.

As discussed above, delivery of BreadCrumbs can be effectuated via a separate BreadCrumb application. In some embodiments, delivery may alternatively or additionally be effectuated via email or messaging client applications, which can be offered as an in-mail/messenger application. In some embodiments, BreadCrumbs can be delivered via SMS, MMS, social message notifications or messages, or other known or to be known methods or techniques. As such, the systems and methods discussed herein for communication of BreadCrumbs can be utilized to drive user engagement for both private individuals and public organizations, whereby each party will profit from the increased mutual engagement.

In Step 402, a request from a sender (referred to as an "owner") is received regarding the delivery of a message in accordance with a context (referred to as at least one delivery condition). Specifically, a BreadCrumb is communicated from an owner as a request to deliver the BreadCrumb upon satisfaction of an associated delivery condition. As discussed above, the BreadCrumb can be any type of text or media message with a defined context of existence. This defined context, or delivery condition, can be in the form of temporal and/or spatial data. That is, the context can define a time (when) and/or a place (where) for which delivery of a message is conditioned upon. For example, as elaborated upon in more detail below, if user A leaves a BreadCrumb for his wife at a grocery store to pick up milk, upon user B, the wife, arriving at the grocery store, user B will then receive the message regarding the milk. In some embodiments, the defined context may also or alternatively involve more a sophisticated dimension(s), such as, but not limited to, virtual locations, specific application usage, and the like, as discussed above.

According to some embodiments, the BreadCrumb is conditioned on the recipient being in a certain context, defined by the sender, thereby allowing the sender (or owner) to determine under which circumstance(s) his/her message should reach its destination (e.g., intended recipient(s)). Therefore, the BreadCrumb received in Step 402 from the owner comprises information related to the owner of the message, recipient(s) of the message, message content and delivery conditions (or message context).

In Step 404, the received message is analyzed to determine the identity the owner of the message, delivery condition(s) and intended recipient(s) of the message. It should be understood that the identity of the owner and/or recipient can be a telephone number, IP address, username, email address, or any other known or to be known identifier of a user on a network, or within an application platform.

In Step 406, a determination is made regarding the type of message and context within which it is being sent. That is, determinations are made regarding whether the message is a personal message or a broadcasting message. In some embodiments, this determination is based upon information provided by the owner of the message. That is, the owner of the message, upon drafting and sending the message, may designate the message as a personal or broadcasting message. As discussed in more detail below, a broadcasting message may need an accompanying fee or payment; therefore, such designation can be processed based on information indicating a fee/payment has occurred.

In some embodiments, the delivery of personal messages further hinges upon whether the message is being communicated to a known contact (within the communication facilitating application, e.g., messaging application/platform, or between users in general). That is, whether the owner and recipient(s) have an established relationship (or are friends). This relationship can be based upon information within the owner's profile or recipient's profile, contact list, past message activity, and any other known or to be known technique for determining existing relationships between users. Further, such determination further forms the basis for how a message (or BreadCrumb) is indexed for ultimate delivery, as discussed in more detail below.

According to some embodiments, determinations within Step 406 can be derived from information related to the identity of the sender, and/or identity and/or number of recipients. That is, for example, if the message owner is an individual, and the message is intended to be sent to a single recipient or small group of recipients, then it is likely that the message is a personal message relaying a typical social message. In some embodiments, this categorization of message type may also be based on the manner of communication. That is, if the message is sent by an owner via SMS, then it is more likely that the message should be treated as a personal message. However, if the message is communicated by an organization via email to a plurality of unknown users, then the message may be classified as a broadcasting message. In some embodiments, if the message is from an organization or entity, then the message may be classified as a broadcasting message. Additionally, in some embodiments, the message content may be parsed to determine the type of message, and based on this determination, the message may be classified. For example, if the message is from a single person, but relates to a coupon for purchasing a product as his/her garage sale, this may be classified as a broadcasting message.

If the message is a personal message and the recipient(s) is a "friend" of the owner (e.g., friend generated BreadCrumb), then process 400 proceeds to Step 408. In Step 408, the identified recipient(s)'s activity is monitored. Such monitoring may be performed dynamically in response to external conditions related to spatial and/or temporal data (or other data related to the type of delivery condition) associated with the recipient. For example, owner A has sent recipient B a message stating that upon arriving to work, recipient B should grab owner A some coffee. This message was communicated from owner A via SMS message to recipient B's mobile device. Therefore in order to ascertain (or determine) recipient B's mobile device location, GPS data associated with recipient B's device is monitored. In Step 410, a determination is made as to whether the delivery conditions of the message are met. From the above example, upon recipient B arriving at the work location, Step 410 would produce a positive (or true) result indicating that the recipient has satisfied the delivery condition. Therefore, upon satisfaction of the delivery condition, the message is transmitted to the recipient. Step 412. In some embodiments, delivery of the BreadCrumb comprises the recipient receiving a notification of a BreadCrumb, where the recipient must open the BreadCrumb on his/her device. In some embodiments, the BreadCrumb is automatically delivered to the recipient for display on the user's device. As mentioned above and discussed in more detail below, delivery in Step 412 for a friend generated message (or BreadCrumb) will be delivered in a push mode upon the recipient's arrival respective the delivery conditions.

According to some embodiments with respect to Steps 408-412, delivery conditions may be tested periodically according to a time period set by the owner, recipient, system as a whole, or any combination thereof. Such testing can include periodic inspections of necessary data resources and comparisons of various data elements (e.g., current location and time of current location) of a recipient as needed to determine of the delivery condition is met. In other words, a recipient's location can be sampled periodically to determine if relevant BreadCrumbs are found corresponding to the recipient. Based on such testing, continuous determinations can be performed to ascertain whether a delivery condition is satisfied. If the condition is not satisfied, then the delivery conditions are continually retested according to a recursive periodic loop until satisfaction is determined.

If the message is a personal message and the recipient(s) is not a friend (e.g., non-friend generated BreadCrumb), or in other words "unknown" to the owner or vice versa, transmittal of a message is performed in a pull mode. That is, in Step 414, after determination that the message is a personal message and the intended recipient is unknown to the owner (or the owner is unknown to the recipient, or both), the recipient sends a request for identification of any messages (or BreadCrumbs) intended for delivery. In Step 416, if the delivery conditions are met, as discussed above, the message is delivered to the recipient via pull mode (Step 418). In some embodiments, delivery of the BreadCrumb comprises the recipient receiving a notification of a BreadCrumb, where the recipient must open the BreadCrumb on his/her device. In some embodiments, the BreadCrumb is automatically delivered to the recipient for display on the user's device in response to Steps 414 and 416.

Turning the delivery of messages discussed in Steps 412 and 418, such delivery is predicated upon whether the owner and recipient are "friends." All friend generated BreadCrumbs will be delivered in a push mode upon a recipient's arrival to a relevant location within the defined time-frame (if any). All non-friend generated BreadCrumbs will be picked up actively in a pull mode by the recipient. In some embodiments, the systems and methods discussed herein implement a backend system supporting two indexes: (1) a push BreadCrumbs index; and (2) a pull BreadCrumbs index. The push index is focused upon retrieval efficiency, with a very low latency. Each BreadCrumb is indexed by all components of its delivery condition (or context), such as, recipient, lifespan, location, time, and the like. In some embodiments, a context's (or condition's) location can be utilized to better locate storage (or indexing) of a BreadCrumb. For example, for a BreadCrumb for a shop in New York City, the BreadCrumb may be indexed in a server column in the east-coast rather than the west coast.

For messages determined to be broadcasting messages from Step 406 (e.g., broadcasting BreadCrumb), such messages are typically only served in pull mode, as discussed above. That is, in Step 420, after determination that the message is a broadcasting message, each recipient sends a request for identification of any messages (or BreadCrumbs) intended for delivery upon arriving at a location. Step 420. In Step 422, if the delivery conditions are met, as discussed above, the message is delivered to each recipient via pull mode (Step 424). In some embodiments, delivery of the BreadCrumb comprises the recipient receiving a notification of a BreadCrumb, where the recipient must open the BreadCrumb on his/her device. In some embodiments, the BreadCrumb is automatically delivered to the recipient for display on the user's device in response to Steps 420 and 422. As discussed above, embodiments exist where broadcasting messages are delivered via push mode only when a recipient has already added the owner to his/her friends list. Additionally, as discussed above, in some embodiments, broadcasting fees may apply in order to prevent senders of such broadcasted messages from spamming other users.

Figure 5A:
FIGS. 5A-5D illustrate non-limiting examples of disclosed systems and methods in accordance with embodiments of the present disclosure.

With respect to the discussion of processes 300 and 400 discussed above, a full application of such components and steps is now discussed by way of a non-limiting example with reference to examples illustrated in FIGS. 5A-5D:

Ben is visiting the Zoo with his children and he finds out that there are panda cubs near the west gate. He luckily arrives to see them right when they decide to feed, which turns out to be 1:00 PM (or 13:30). Ben the leaves a BreadCrumb at the Zoo for several of his friends, expiring in a year (right about when the cubs will be moved to the grown up panda area in the Zoo). In the BreadCrumb, Ben leaves the cubs feeding schedule, location and a short movie. When Ben's friend Michal visits the same Zoo two months later, she receives a BreadCrumb notification stating "Ben left you a BreadCrumb here . . . ," as illustrated in FIG. 5A. FIG. 5A illustrates Michal's mobile device 500 displaying a BreadCrumb notification 502. As discussed above, this notification is provided via a push notification from Ben to Michal as it appears on Michal's device.

Figure 5B:
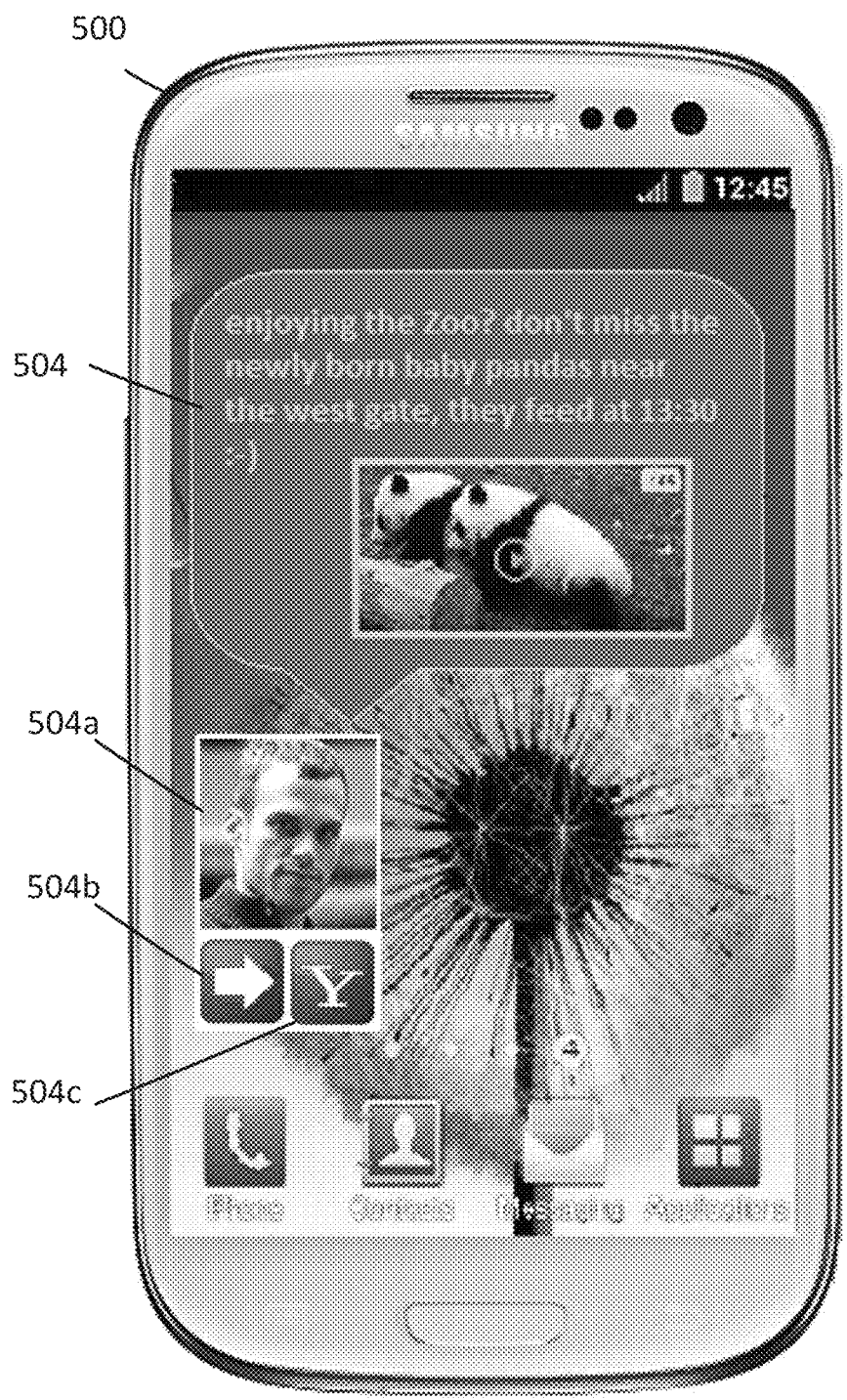

Michal opens this notification and finds a BreadCrumb with the movie left by Ben, as illustrated in FIG. 5B. FIG. 5B illustrates Michal's mobile device 500 displaying BreadCrumb 504 as left by Ben. This BreadCrumb 504 includes a movie and the text "enjoying the Zoo? don't miss the newly born baby pandas near the west gate, they feed at 13:30)". In some embodiments, adjacent to the BreadCrumb 504 (e.g., on the bottom) can be an identifier of the owner; here, Ben's picture 504a is displayed, for example. Additionally, in some embodiments, the BreadCrumb 504 can be offered with two optional action buttons (e.g., under Ben's picture): an "arrow" 504b that stands for forwarding BreadCrumb 504, and "Y" 504c that stands for "Yes" to send Ben a notification of delivery confirmation. It should be understood that the location of the additional information accompanying the display of the BreadCrumb is not limited to the displayed embodiment discussed here, as the additional displayed information can be displayed in any orientation on a user's device. Additionally, it should be understood that the display of any text or content with reference to the illustrated examples discussed herein are for illustrative purposes, and should not be construed to limit the orientation, location and/or aesthetic of the banners, dialog boxes and/or content displayed on a user's device.

Figure 5C:

Michal takes up Ben's advice from the BreadCrumb and visits the panda cub feeding with her children. After enjoying the panda feeding at the west gate of the Zoo, she sends an acknowledgement of acceptance to Ben. Ben receives this notification of acceptance from Michal, as illustrated in FIG. 5C. FIG. 5C illustrates Ben's mobile device 550 displaying the BreadCrumb acknowledgement notification 506 (or delivery confirmation) sent by Michal.

Figure 5D:
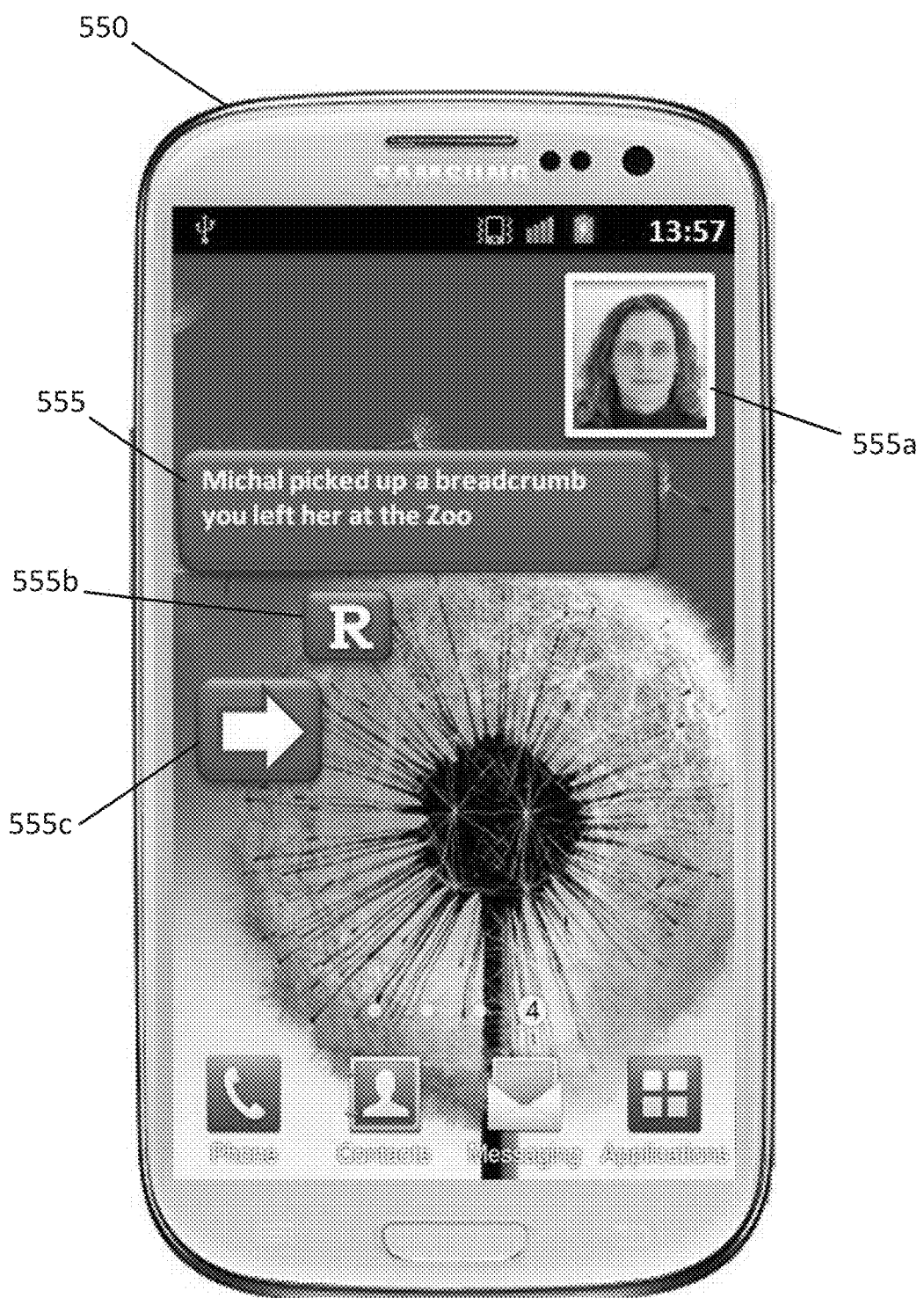

In some embodiments, the delivery confirmation may further provide Ben the ability to retire the BreadCrumb or forward it onwards to more friends, as discussed above and illustrated in FIG. 5D. For example, FIG. 5D illustrates Ben's mobile device 550 displaying the delivery confirmation (or BreadCrumb acknowledgment) 555 which states "Michal picked up a breadcrumb you left her at the Zoo In some embodiments, for example, the confirmation message may state "Michal has confirmed picking up your BreadCrumb." That is, the system allows Michal to pick up the BreadCrumb without confirming doing so (in order to preserve his/her— the recipient's—privacy of being in that specific location at a specific time). Thus, the system allows the sender to know that Michal may pick up his/her BreadCrumb without confirming it, and then, the sender would not be able to know it was picked up. In some embodiments, The BreadCrumb confirmation 555 can include, in some embodiments adjacent to it, an identifier of the sender of the acknowledgment. Here, an image of Michal 555a is displayed above the confirmation 555. Additionally, in some embodiments, the BreadCrumb acknowledgement 555 can offer the owner (Ben) to "R" 555b, which stands for retiring the BreadCrumb 504, so as not to deliver it to any additional recipients. In some embodiments, an "arrow" 555c standing for forwarding the associated BreadCrumb 504 to additional users can be displayed as well. In some embodiments. Michal could have also chosen to add additional content (e.g., a movie of her own showing how the cubs have grown during these two months that have passed since Ben left the BreadCrumb) to her acknowledgment. Therefore, this additional content (e.g., movie) could have been displayed within BreadCrumb acknowledgement 555, as illustrated in FIG. 5D.

According to some embodiments, a BreadCrumb context or delivery conditions, or the system discussed herein can place restrictions upon receiving messages. That is, messages can be halted, and/or the BreadCrumb service/application made unavailable due to a determined location and/or activity of a recipient of a BreadCrumb. For example, Luke sends Owen a message to check out a snake farm located on US 35. While Owen is driving by the snake farm on US 35, he is within the radius of the snake farm; however, while it is not only unsafe to check messages while driving, it is also illegal, the BreadCrumb service/application can determine that Owen is driving and disable the message delivery to Owen. Such determination can be based upon the rate of speed, or rate of change in Owen's location, which would lead an intuitive system, as discussed herein, to determine a user is driving (or within) a vehicle. Therefore, Owen would not receive the message, and in some embodiments, would not be able to access the BreadCrumb service/application during such time he is within his vehicle.

Figure 6:
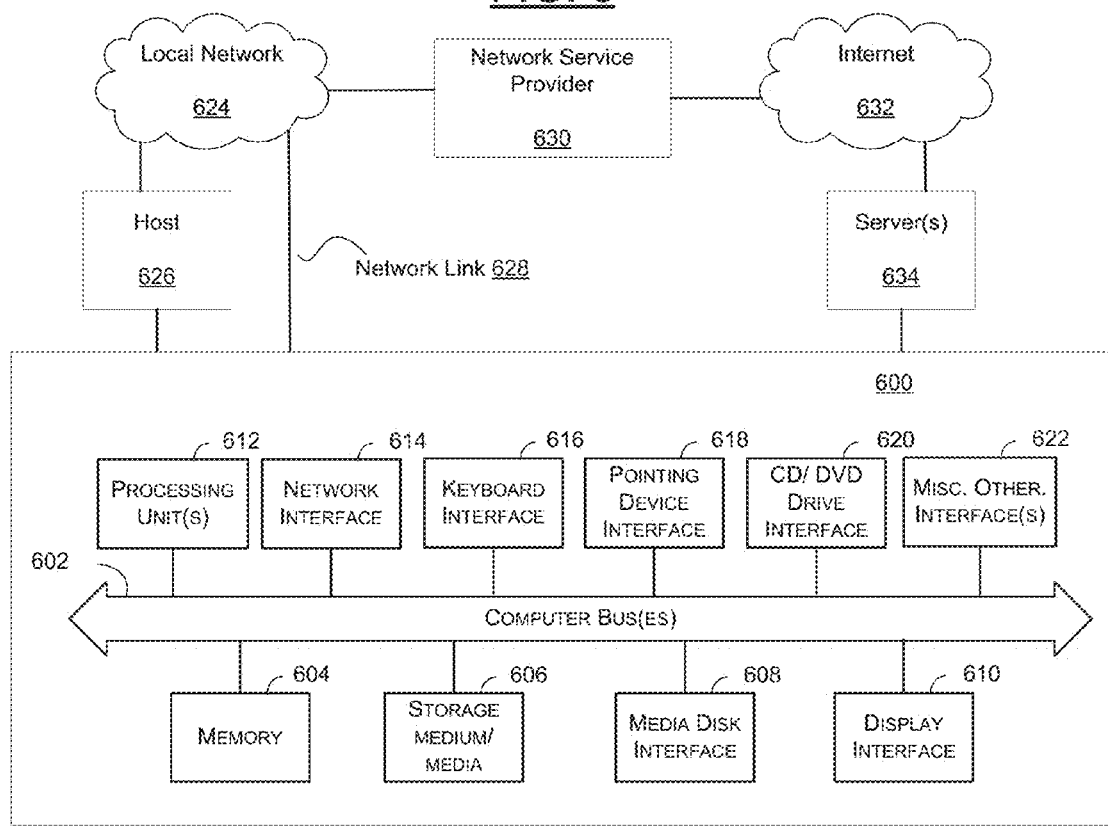
FIG. 6 is a block diagram illustrating architecture of a hardware device in accordance with one or more embodiments of the present disclosure.

As shown in FIG. 6, internal architecture 600 includes one or more processing units, processors, or processing cores, (also referred to herein as CPUs) 612, which interface with at least one computer bus 602. Also interfacing with computer bus 602 are computer-readable medium, or media, 606, network interface 614, memory 604, e.g., random access memory (RAM), run-time transient memory, read only memory (ROM), media disk drive interface 620 as an interface for a drive that can read and/or write to media including removable media such as floppy, CD-ROM, DVD, media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces and a universal serial bus (USB) interface.

Memory 604 interfaces with computer bus 602 so as to provide information stored in memory 604 to CPU 612 during execution of software programs such as an operating system, application programs, device drivers, and software modules that comprise program code, and/or computer executable process steps, incorporating functionality described herein, e.g., one or more of process flows described herein. CPU 612 first loads computer executable process steps from storage, e.g., memory 604, computer readable storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Persistent storage, e.g., medium/media 606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 628 typically provides information communication using transmission media through one or more networks to other devices that use or process the information. For example, network link 628 may provide a connection through local network 624 to a host computer 626 or to equipment operated by a Network or Internet Service Provider (ISP) 630. ISP equipment in turn provides data communication services through the public, worldwide packet-switching communication network of networks now commonly referred to as the Internet 632.

A computer called a server host 634 connected to the Internet 632 hosts a process that provides a service in response to information received over the Internet 632. For example, server host 634 hosts a process that provides information representing video data for presentation at display 610. It is contemplated that the components of system 600 can be deployed in various configurations within other computer systems, e.g., host and server.

At least some embodiments of the present disclosure are related to the use of computer system 600 for implementing some or all of the techniques described herein. According to one embodiment, those techniques are performed by computer system 600 in response to processing unit 612 executing one or more sequences of one or more processor instructions contained in memory 604. Such instructions, also called computer instructions, software and program code, may be read into memory 604 from another computer-readable medium 606 such as storage device or network link. Execution of the sequences of instructions contained in memory 604 causes processing unit 612 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 600. Computer system 600 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 602 as it is received, or may be stored in memory 604 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, at a computing device over a network, a request to deliver a first message from a sender to a mobile device associated with a recipient, the first message comprising message content and a message context, said message context indicating a location for delivery of said message and a lifespan of said message, said mobile device associated with an identifier of said recipient;
   determining, via the computing device, spatial data associated with said mobile device of said recipient based on said identifier, said spatial data comprising information indicating a current location of said mobile device;
   determining, via the computing device, that said recipient satisfies said message context based on said spatial data, said determination comprising identifying that said spatial data associated with said mobile device of said recipient matches said location for delivery, said matching corresponds to the current location of the mobile device and the location for delivery being at least within a radius of each other; and
   delivering, via the computing device, said message to said mobile device associated with said recipient.

2. The method of claim 1, wherein said message context is set by said sender of the message.

3. The method of claim 1, further comprising:
   determining a relationship between said sender and said recipient, said relationship determination comprising identifying whether an existing relationship exists between said sender and recipient.

4. The method of claim 3, further comprising:
   delivering said message to said recipient via a push mode if said relationship comprises an existing relationship between said sender and said recipient, wherein said message is pushed to said recipient upon said spatial data being within said radius of said delivery location.

5. The method of claim 3, wherein upon a determination that said relationship is not an existing relationship, further comprising:
   receiving from the mobile device of said recipient a request for said message, said request querying whether any message is available for said recipient;
   determining that said message is intended for said recipient based on said identifier of said message; and
   upon satisfaction of said spatial data being within said radius of said delivery location, transmitting said message to said recipient.

6. The method of claim 1, further comprising:
   in response to receiving said request for delivery from said recipient, storing said message in storage based upon said delivery location, said storage located in a physical proximity to said delivery location.

7. The method of claim 1, wherein said delivery comprises:
   transmitting a notification of said message to said recipient; and
   in response to an action by said recipient indicating a desire to open said message, transmitting said message to said recipient.

8. The method of claim 1, further comprising:
   determining that said spatial data is within said radius of said delivery location during said lifespan of said message, wherein if said lifespan is still valid, delivering said message to said recipient.

9. The method of claim 1, further comprising:
   receiving from said sender a service fee for broadcasting said message to a plurality of recipients located at said delivery location;
   receiving a request from at least one recipient from said plurality of recipients at said location for delivery of said message; and
   delivering said message to said requesting recipient via pull mode.

10. The method of claim 9, wherein said message is an advertisement.

11. The method of claim 1, further comprising:
    transmitting to said sender a notification that said message has been received by said recipient, said notification transmittal in response to said delivery of said message;
    facilitating display of options on a device associated with said sender based on said message delivery, said options comprising an ability for said sender to retire said message and an ability for said sender to forward said message to a second recipient.

12. The method of claim 1, further comprising:
    determining said recipient is driving a vehicle based on said spatial data; and
    delaying delivery of said message upon a subsequent determination that said recipient is no longer driving said vehicle, wherein said delivery is disabled while said recipient is driving.

13. A non-transitory computer-readable storage medium tangibly encoded with computer-executable instructions, that when executed by a processor of a computing device, perform a method comprising:
    receiving a request to deliver a first message from a sender to a mobile device associated with a recipient, the first message comprising message content and a message context, said message context indicating a location for delivery of said message and a lifespan of said message, said mobile device associated with an identifier of said recipient;
    determining spatial data associated with said mobile device of said recipient based on said identifier, said spatial data comprising information indicating a current location of said mobile device;
    determining that said recipient satisfies said message context based on said spatial data, said determination comprising identifying that said spatial data associated with said mobile device of said recipient matches said location for delivery, said matching corresponds to the current location of the mobile device and the location for delivery being at least within a radius of each other; and
    delivering said message to said mobile device associated with said recipient.

14. The non-transitory computer-readable storage medium of claim 13, further comprising:
    determining a relationship between said sender and said recipient, said relationship determination comprising identifying whether an existing relationship exists between said sender and recipient.

15. The non-transitory computer-readable storage medium of claim 14, further comprising:
    delivering said message to said recipient via a push mode if said relationship comprises an existing relationship between said sender and said recipient, wherein said message is pushed to said recipient upon said spatial data being within said radius of said delivery location.

16. The non-transitory computer-readable storage medium of claim 14, wherein upon a determination that said relationship is not an existing relationship, further comprising:
receiving from the mobile device of said recipient a request for said message, said request querying whether any message is available for said recipient;
determining that said message is intended for said recipient based on said identifier of said message; and
upon satisfaction of said spatial data being within said radius of said delivery location, transmitting said message to said recipient.

17. The non-transitory computer-readable storage medium of claim 13, wherein said delivery comprises:
transmitting a notification of said message to said recipient; and
in response to an action by said recipient indicating a desire to open said message, transmitting said message to said recipient.

18. The non-transitory computer-readable storage medium of claim 13, further comprising:
determining that said spatial data is within said radius of said delivery location during said lifespan of said message, wherein if said lifespan is still valid, delivering said message to said recipient.

19. The non-transitory computer-readable storage medium of claim 13, further comprising:
transmitting to said sender a notification that said message has been received by said recipient, said notification transmittal in response to said delivery of said message;
facilitating display of options on a device associated with said sender based on said message delivery, said options comprising an ability for said sender to retire said message and an ability for said sender to forward said message to a second recipient.

20. A system comprising:
at least one computing device comprising:
memory storing computer-executable instructions; and
one or more processors for executing said computer-executable instructions, comprising:
receiving a request to deliver a first message from a sender to a mobile device associated with a recipient, the first message comprising message content and a message context, said message context indicating a location for delivery of said message and a lifespan of said message, said mobile device associated with an identifier of said recipient;
determining spatial data associated with said mobile device of said recipient based on said identifier, said spatial data comprising information indicating a current location of said mobile device;
determining that said recipient satisfies said message context based on said spatial data, said determination comprising identifying that said spatial data associated with said mobile device of said recipient matches said location for delivery, said matching corresponds to the current location of the mobile device and the location for delivery being at least within a radius of each other; and
delivering said message to said mobile device associated with said recipient.

* * * * *